US012703185B2

(12) United States Patent
Kouno

(10) Patent No.: US 12,703,185 B2
(45) Date of Patent: Aug. 11, 2026

(54) LIQUID STORAGE CONTAINER

(71) Applicant: CANON KABUSHIKI KAISHA, Tokyo (JP)

(72) Inventor: Keisuke Kouno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/052,104

(22) Filed: Feb. 12, 2025

(65) Prior Publication Data

US 2025/0178353 A1 Jun. 5, 2025

Related U.S. Application Data

(63) Continuation of application No. 17/962,385, filed on Oct. 7, 2022, now Pat. No. 12,257,846.

(30) Foreign Application Priority Data

Oct. 15, 2021 (JP) ................................ 2021-169410

(51) Int. Cl.
*B41J 2/175* (2006.01)
*B41J 29/377* (2006.01)

(52) U.S. Cl.
CPC ....... *B41J 2/17533* (2013.01); *B41J 2/17513* (2013.01); *B41J 2/17553* (2013.01); *B41J 2/17596* (2013.01); *B41J 29/377* (2013.01)

(58) Field of Classification Search
CPC .. B41J 2/17513; B41J 29/377; B41J 2/17506; B41J 2/17509; B41J 2/17596;
(Continued)

(56) References Cited

U.S. PATENT DOCUMENTS 4,156,435 A 5/1979 Norton et al.
5,659,347 A 8/1997 Taylor
(Continued)

FOREIGN PATENT DOCUMENTS

CN 2855744 Y 1/2007
CN 104070821 10/2014
(Continued)

OTHER PUBLICATIONS

Office Action dated Jun. 28, 2025 in counterpart Chinese Application No. 202211257151.6, together with English translation thereof.
(Continued)

*Primary Examiner* — John P Zimmermann
(74) *Attorney, Agent, or Firm* — Venable LLP

(57) ABSTRACT

Disclosed is a liquid storage container comprising: a liquid reservoir reserving a liquid; an air communication passage for communicating the liquid reservoir with an atmosphere; a partition wall separating an inside and outside of the liquid reservoir; a through hole penetrating the partition wall in a first direction; a movable support member capable of moving in the through hole in the first direction; a first seal member disposed in the liquid reservoir and fixed to the movable support member; and a biasing member biasing the movable support member to locate the first seal member at a closing position to close the air communication passage, wherein the movable support member has receiving part receiving an external force to move the first seal member from the closing position so that the inside of the liquid reservoir part communicates with the outside of the liquid reservoir via the air communication passage.

20 Claims, 13 Drawing Sheets

(58) Field of Classification Search
CPC ... B41J 2/305; B41J 2/175; B41J 2/19; B65D 51/16; B65D 83/38; B60T 11/22; F16K 17/04
See application file for complete search history.

(56) References Cited

U.S. PATENT DOCUMENTS

| | | | | |
|---|---|---|---|---|
| 6,719,415 | B1 * | 4/2004 | Hattori | B41J 2/17566 347/86 |
| 7,222,949 | B2 * | 5/2007 | Ichihashi | B41J 2/17556 347/86 |
| 8,480,216 | B2 | 7/2013 | Matsumoto et al. | |
| 10,618,305 | B2 | 4/2020 | Eto | |
| 11,718,099 | B2 * | 8/2023 | Osakabe | B41J 2/17566 347/85 |
| 12,023,936 | B2 | 7/2024 | Oya | |
| 2002/0063759 | A1 | 5/2002 | Hirano et al. | |
| 2002/0129602 | A1 | 9/2002 | Tsubouchi | |
| 2007/0103521 | A1 | 5/2007 | Nip | 347/86 |
| 2010/0231667 | A1 | 9/2010 | Kanbe | 347/92 |
| 2010/0238241 | A1 | 9/2010 | Sasaki | 347/86 |
| 2010/0289856 | A1 | 11/2010 | Yamamoto et al. | |
| 2013/0112714 | A1 | 5/2013 | Ho | |
| 2014/0292958 | A1 | 10/2014 | Tomoguchi et al. | |
| 2017/0318993 | A1 * | 11/2017 | Young | A47G 19/2272 |
| 2018/0272741 | A1 | 9/2018 | Kobayashi et al. | |
| 2019/0291453 | A1 | 9/2019 | Eto | |
| 2020/0180318 | A1 | 6/2020 | Kobayashi et al. | |
| 2021/0362506 | A1 | 11/2021 | Kishikawa et al. | |
| 2022/0088937 | A1 * | 3/2022 | Oya | B41J 2/17553 |
| 2022/0097388 | A1 | 3/2022 | Nanjo et al. | |

FOREIGN PATENT DOCUMENTS

| | | | |
|---|---|---|---|
| CN | 205395458 | U | 7/2016 |
| CN | 109318590 | | 2/2019 |
| CN | 110356118 | | 10/2019 |
| CN | 213786824 | U | 7/2021 |
| CN | 214274521 | U | 9/2021 |
| DE | 102015203336 | | 8/2016 |
| JP | H08-300673 | | 11/1996 |
| JP | 2002-200774 | | 7/2002 |
| JP | 2010-214687 | | 9/2010 |
| JP | 2010-221470 | | 10/2010 |
| JP | 2018-161876 | | 10/2018 |

OTHER PUBLICATIONS

Office Action dated Jul. 8, 2025 in counterpart Japanese Application No. 2021-0169410, together with English translation thereof.

* cited by examiner

LIQUID STORAGE CONTAINER

CROSS-REFERENCE TO RELATED APPLICATIONS

This application is a continuation of U.S. application Ser. No. 17/962,385 filed Oct. 7, 2022, currently pending; and claims priority under 35 U.S.C. § 119 to Japan Application No. JP2021-169410 filed in Japan on Oct. 15, 2021; and the contents of all of which are incorporated herein by reference as if set forth in full.

BACKGROUND OF THE INVENTION

Field of the Invention

The present invention relates to a liquid storage container capable of being detachably attached to a printing apparatus.

Description of the Related Art

Japanese Patent Application Laid-Open No. 2018-161876 discloses a liquid cartridge detachably attached to a printer body. As shown in FIGS. 12 and 13, the liquid cartridge has an air communication part 130 having an air communication port 134 and a liquid reservoir chamber 132 for reserving a liquid. A valve 500 is provided in a communication port 131 for communicating the air communication part 130 with the liquid reservoir chamber 132. The valve 500 comprises a lever 510, a valve element 520, a coil spring 530, a seal member 540 and the like. In the liquid cartridge before attached, the seal member 550 closes the communication port 131 by biasing force of the coil spring 530. When the liquid cartridge is attached to the printer main body, the lever 510 is brought down by a pressing portion 320, and the valve element 520 moves in a direction opposite to the biasing direction of the coil spring 530. As a result, the seal member 540 is separated from the communication port 131, and the liquid reservoir chamber 132 is switched to an open state communicating with the air communication port 134.

SUMMARY OF THE INVENTION

In the liquid cartridge disclosed in Japanese Patent Application Laid-Open No. 2018-161876, even when the liquid cartridge is detached from the printer main body, the lever 510 remains in an open state of the liquid cartridge in a fallen state, so that liquid may leak from the liquid cartridge. Further, since the valve element 520 is disposed outside the liquid reservoir chamber 132 and valve element 520 is configured to close the communication port 131 from the outside, when the internal pressure of the liquid reservoir chamber 132 increases, there is a possibility that the valve element 520 is separated from the communication port 131 and liquid leaks from the liquid cartridge.

It is an object of the present disclosure to provide a liquid storage container capable of preventing leakage of the liquid.

A liquid storage container of the present disclosure, comprising: a liquid reservoir part configured to reserve a liquid; an air communication passage for communicating the liquid reservoir part with an atmosphere; a partition wall configured to separate an inside of the liquid reservoir part and an outside of the liquid reservoir part; a through hole configured to penetrate the partition wall in a first direction; a movable support member capable of moving in the through hole in the first direction; a first seal member disposed in the liquid reservoir part and fixed to the movable support member; and a biasing member configured to bias the movable support member so that the first seal member positions at a closing position where the first seal member closes the air communication passage. In the liquid storage container, the movable support member has receiving part configured to receive an external force, and the external force moves the first seal member from the closing position so that the inside of the liquid reservoir part communicates with the outside of the liquid reservoir part via the air communication passage.

Further features of the present invention will become apparent from the following description of exemplary embodiments with reference to the attached drawings.

DESCRIPTION OF THE EMBODIMENTS

Embodiments of the present disclosure will now be described in detail with reference to the drawings. However, the components described in the embodiments are merely examples and are not intended to limit the scope of the present disclosure to them.

First Embodiment

Figure 1:
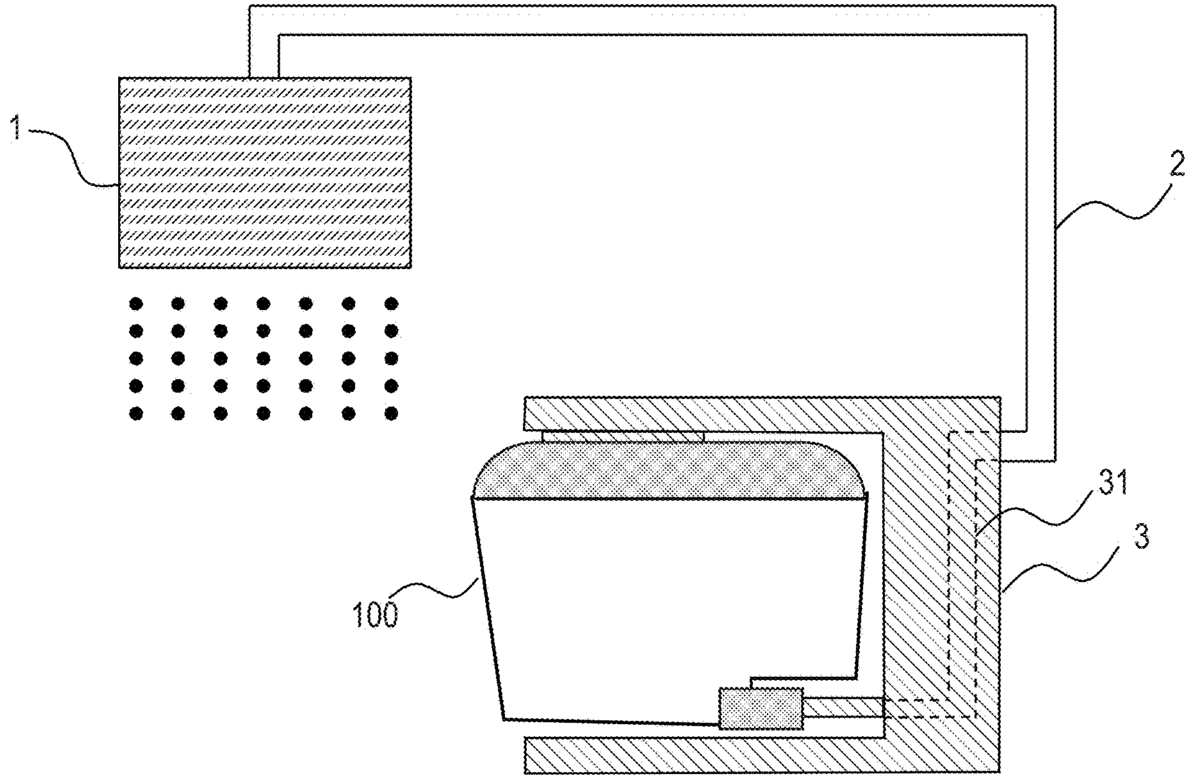
FIG. 1 is a schematic view showing a main configuration of a printing apparatus to which a liquid storage container of the present disclosure is applied.

FIG. 1 is a schematic view showing a main configuration of a printing apparatus to which a liquid storage container of the present disclosure is applied. The printing apparatus is an ink jet printing apparatus for ejecting a liquid such as ink. The printing apparatus includes a holder 3 for holding a liquid storage container 100 according to a first embodiment of the present disclosure, and a printing head 1 to which a liquid is supplied from the liquid storage container 100 held by the holder 3 via a tube 2. The liquid storage container 100 is detachably attached to the holder 3. The printing head 1 is mounted on a carriage, for example, and ejects the liquid toward a printing medium such as paper. The liquid consumed by the ejection is supplied to the printing head 1 from the liquid storage container 100. In an inside of the holder 3, a joint needle 310 and an internal flow passage 31 communicated with the tube 2, which are described later are provided.

Next, the configuration of the liquid storage container 100 according to the first embodiment of the present disclosure will be described in detail.

Figure 2:
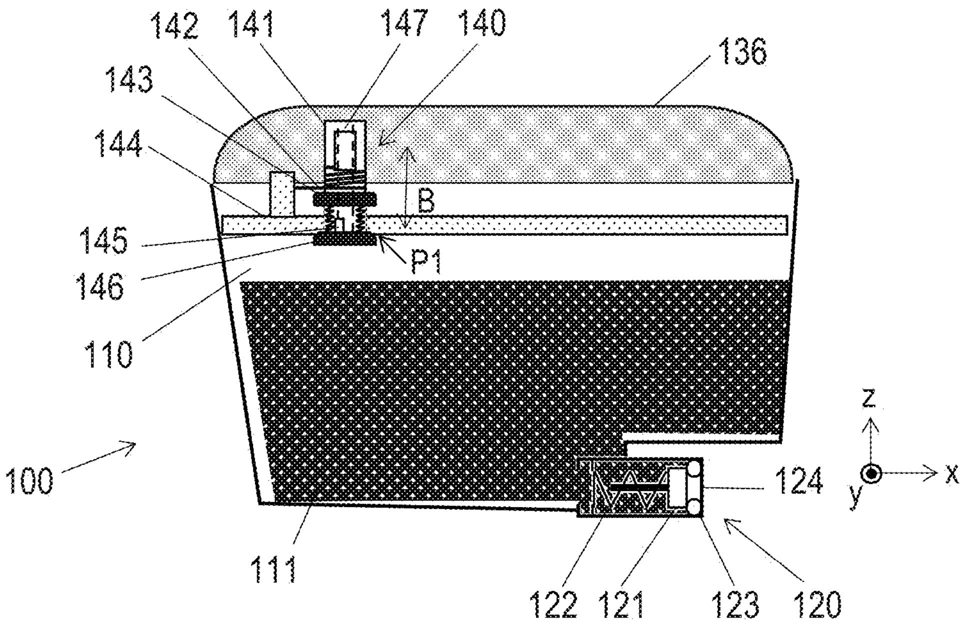
FIG. 2 is a cross sectional view showing a configuration of a liquid storage container according to a first embodiment of the present disclosure.

FIG. 2 is a cross sectional view showing a configuration of the liquid storage container 100. FIG. 2 shows a configuration of a cross section cut in the vertical direction along the longitudinal direction of the liquid storage container 100. In FIG. 2, the z-axis indicates a vertical direction, the x-axis and the y-axis indicate a horizontal direction, and the axes are orthogonal to each other.

Referring to FIG. 2, the liquid storage container 100 includes a liquid reservoir part 110, a liquid supply part 120, and a valve unit 140. The liquid reservoir part 110 and the liquid supply part 120 are integrally formed. The liquid reservoir part 110 reserves a liquid such as ink. The liquid supply part 120 supplies the liquid reserved in the liquid reservoir part 110 to the printing head 1. A lid 136 is provided on an upper part of the liquid reservoir part 110. The lid 136 is configured to be capable of accommodating a pressing portion 320 to be described later when the liquid storage container 100 is attached to the holder 3.

The liquid storage container 100 is provided with an air communication passage 147 configured to communicate the liquid reservoir part 110 with the atmosphere. When the liquid is supplied to the printing head 1, the inside of the liquid reservoir part 110 becomes a negative pressure state, but the internal pressure of the liquid reservoir part 110 is kept constant because an external air is taken into the liquid reservoir part 110 through the air communication passage 147. The valve unit 140 switches between a closed state in which the air communication passage 147 is closed and an open state in which the air communication passage 147 is opened.

The configuration of each part of the liquid storage container 100 will be described in detail below.

Liquid Reservoir Part

The liquid storage container 100 has a partition wall 144 configured to separate an inside of the liquid reservoir part 110 and an outside of the liquid reservoir part 110. The partition wall 144 is located at an upper region of the liquid reservoir part 110. In the present embodiment, the partition wall 144 constitutes a lid member of the liquid reservoir part 110. A liquid supply part 120 is provided at a bottom part 111 of the liquid reservoir part 110. Since the bottom part 111 is formed to be inclined downwardly toward the liquid supply part 120, the liquid can be supplied to the printing head 1 without remaining in the bottom part 111.

Liquid Supply Part

Figure 3:
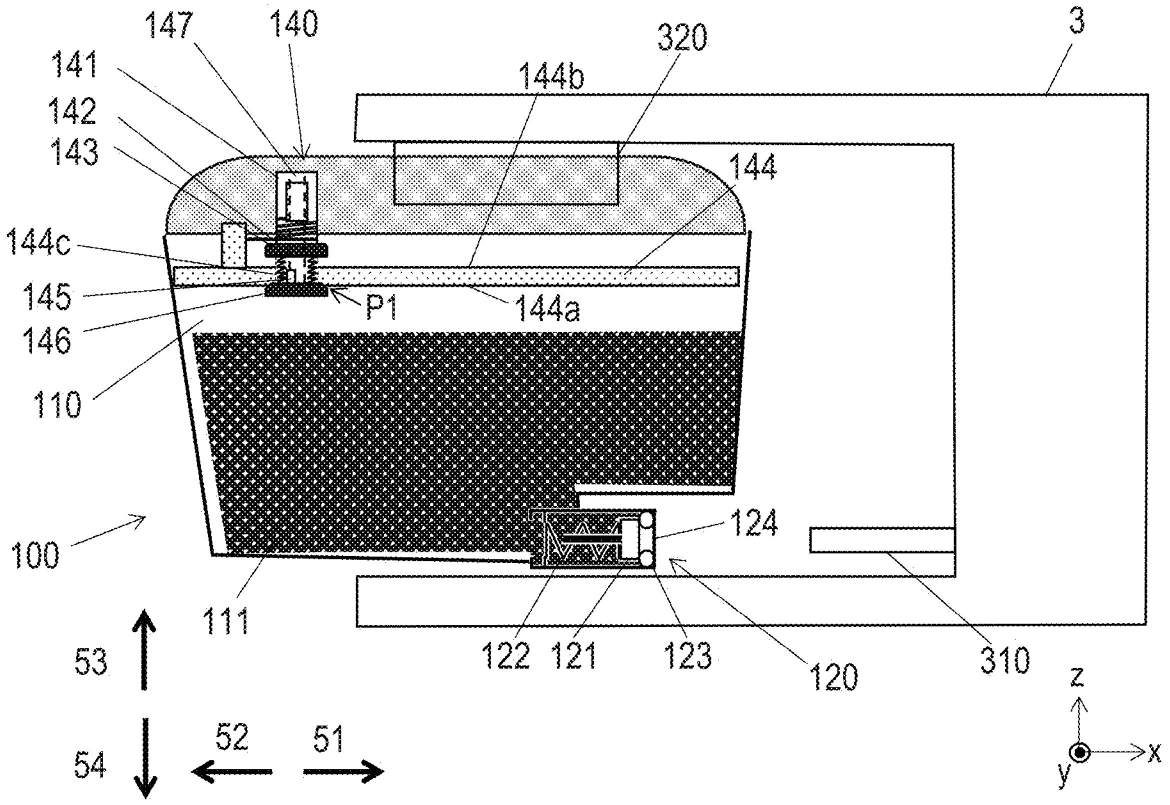
FIG. 3 is a schematic view showing the liquid storage container shown in FIG. 2 when the liquid storage container is not attached to the printing apparatus.
Figure 4:
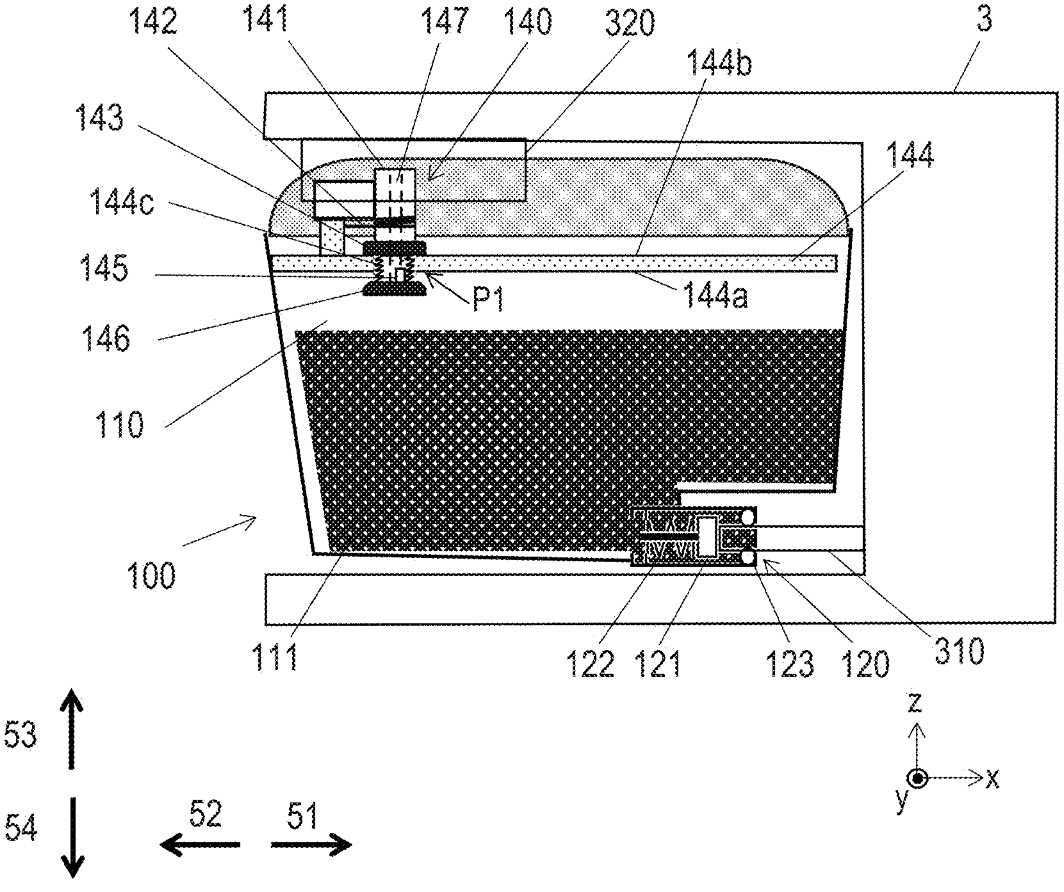
FIG. 4 is a schematic view showing the liquid storage container shown in FIG. 2 when the liquid storage container is attached to the printing apparatus.

Next, the configuration of the liquid supply part 120 will be described in detail with reference to FIGS. 2, 3 and 4. FIG. 3 is a view showing a state immediately before the liquid storage container 100 is attached to the holder 3. FIG. 4 is a view showing a state in which the liquid storage container 100 is completely attached to the holder 3. FIGS. 3 and 4 show cross sections at positions similar to those of FIG. 2. In FIGS. 3 and 4, an arrow 51 indicates an insertion direction when the liquid storage container 100 is attached to the holder 3. An arrow 52 indicates a direction along which the liquid storage container 100 is detached from the holder 3.

The liquid supply part 120 has a liquid supply port 124, a valve element 121, a valve spring 122 and an annular joint seal 123. The valve element 121 is made of a resin material. The valve spring 122 is made of a metal material. The joint seal 123 is made of an elastic member such as rubber and is attached to the liquid supply port 124. The valve spring 122 biases the valve element 121 toward the joint seal 123. By the biasing force of the valve spring 122, the valve element 121 closes the liquid supply port 124 to which the joint seal 123 is attached.

When the liquid storage container 100 is attached to the holder 3, the joint needle 310 is inserted into the liquid supply port 124 as shown in FIG. 4. The joint needle 310 is made of a hollow member and is connected to the tube 2 through an internal flow passage 31. The joint needle 310 constitutes an end of the liquid supply system on the side of the printing apparatus. When the liquid storage container 100 moves in the direction of the arrow 51, the joint needle 310 moves relatively toward the valve element 121 in the liquid supply port 124 while maintaining the sealing property by closely contacting the joint seal 123. The joint needle 310 pushes the valve element 121 in a direction opposite to the biasing direction of the valve spring 122. By the pressing force of the joint needle 310, the valve element 121 is moved in a direction opposite to the biasing direction of the valve spring 122 and separated from the liquid supply port 124. Thereby, the liquid supply port 124 is opened, and the liquid can be supplied from the liquid storage container 100 to the printing head 1.

When the liquid storage container 100 is detached from the holder 3, the liquid storage container 100 is moved in the direction of the arrow 52. The joint needle 310 relatively moves in the liquid supply port 124 in the direction opposite to the insertion direction (the same direction as the biasing direction of the valve spring 122) while maintaining the sealing property by the joint seal 123. As the joint needle 310 exits the liquid supply port 124, the biasing force of the valve spring 122 causes the valve element 121 to close the liquid supply port 124.

Valve Unit and Air Communication Passage

Next, the valve unit 140 and the air communication passage 147 will be described with reference to FIGS. 2, 3 and 4. The valve unit 140 has a movable support member 141, a torsion coil spring 142, a first seal member 146 and a second seal member 143. The first seal member 146 and the second seal member 143 are made of an elastic member such as rubber. A partition wall 144 is provided with a through hole 144*c* penetrating the partition wall 144 in the first direction B (z-axis direction). Specifically, the through hole 144*c* penetrates from a first surface 144*a* facing the liquid reservoir part 110 of the partition wall 144 to a second surface 144*b*, which is a surface on the reverse side of the first surface 144*a*. The movable support member 141 is inserted into the through hole 144*c* and can move in the through hole 144*c* in the first direction B.

One end of the movable support member 141 is located on a side of the liquid reservoir part 110, and the other end is located outside the liquid reservoir part 110. The first seal member 146 is disposed inside the liquid reservoir part 110 and is fixed to the one end of the movable support member 141. The second seal member 143 is disposed outside the liquid reservoir part 110 and is fixed to the movable support member 141. In other words, the first seal member 146 is disposed on the first surface 144*a* side of the partition wall 144, and the second seal member 143 is disposed on the second surface 144*b* side of the partition wall 144. The interval between the first seal member 146 and the second seal member 143 is larger than the thickness of the partition wall 144. The second seal member 143 has an annular shape, and its inner peripheral surface is fixed to the outer peripheral surface of the movable support member 141. The first seal member 146 and the second seal member 143 can be fixed to the movable support member 141 using, for example, an adhesive.

The torsion coil spring 142 is an example of a biasing member for biasing the movable support member 141 such that the first seal member 146 positions at a closing position P1 for closing the air communication passage 147. At the closing position P1, the first seal member 146 can close a gap between the movable support member 141 and the through hole 144*c*. When the movable support member 141 is moved in the direction opposite to the biasing direction of the biasing member, the first seal member 146 is separated from the closing position P1, and the second seal member 143 closes the gap between the movable support member 141 and the through hole 144*c*. When the first seal member 146 is separated from the closing position P1, the liquid reservoir part 110 communicates with the atmosphere through the air communication passage 147.

The air communication passage 147 is provided in the movable support member 141. The air communication passage 147 has a first opening 147*a* communicating with an inside of the liquid reservoir part 110 and a second opening 147*b* communicating with an outside of the liquid reservoir part 110. Here, the air communication passage 147 is provided so as to penetrate from one end to the other end of the movable support member 141. The first opening 147*a* is formed on a side surface of one end of the movable support member 141, and the second opening 147*b* is formed on an end surface of the other end of the movable support member 141. The second opening 147*b* may be formed on a side surface of the movable support member 141. The first opening 147*a* is located inside the liquid reservoir part 110, and the second opening 147*b* is located outside the liquid reservoir part 110. In the closed state in which the first seal member 146 is disposed at the closing position P1, the first opening 147*a* is accommodated in the through hole 144*c*.

A gas-liquid separation membrane 145 for separating gas and liquid is provided in the first opening 147*a* of the air communication passage 147. The gas-liquid separation membrane 145 suppresses a leakage of the liquid stored in the liquid reservoir part 110 to a side of the air communication passage 147 even when the printing device is tilted slightly. The gas-liquid separation membrane 145 preferably has low flow resistance and low liquid permeability. For example, a water-repellent filter can be used for the gas-liquid separation membrane 145.

Figure 5A:
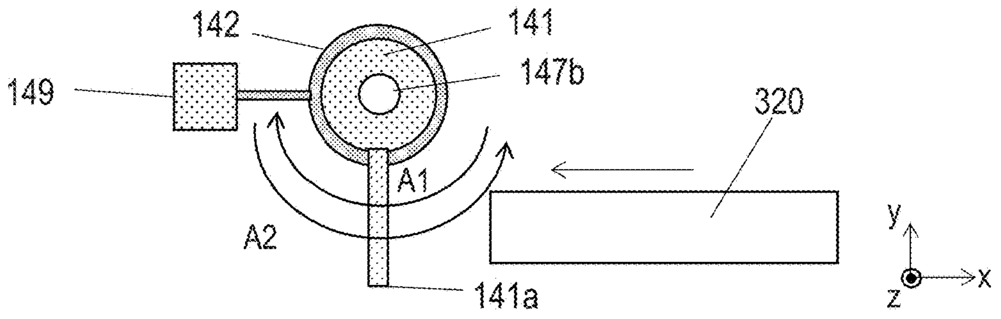
FIGS. 5A and 5B are schematic views showing the biasing mechanism of the liquid storage container in a state shown in FIG. 3.
Figure 5B:
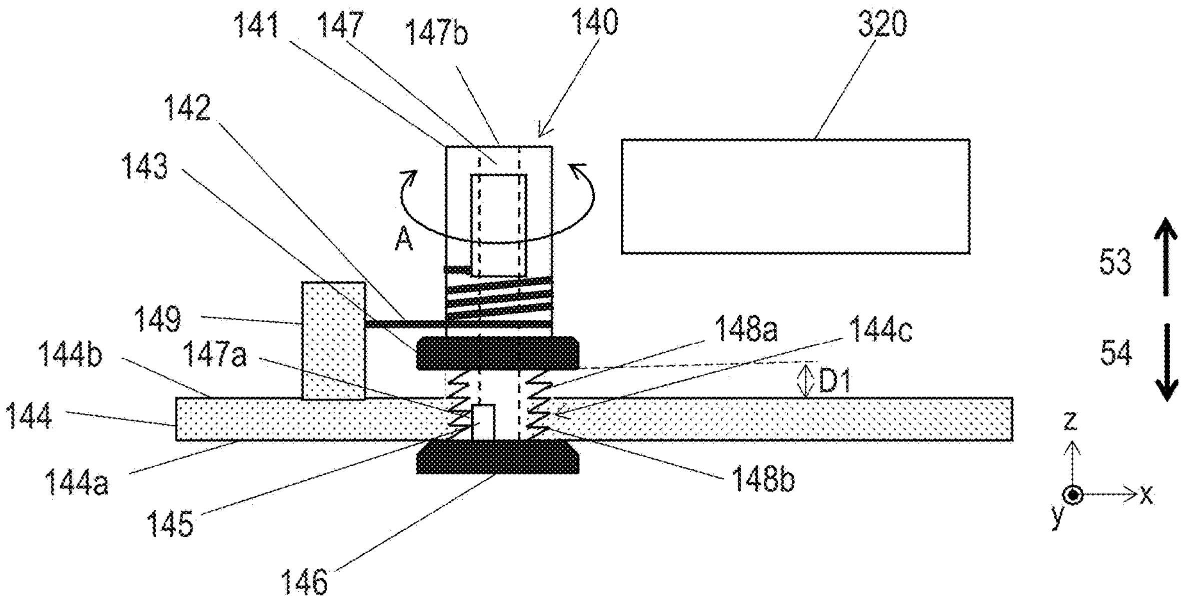
Figure 6A:
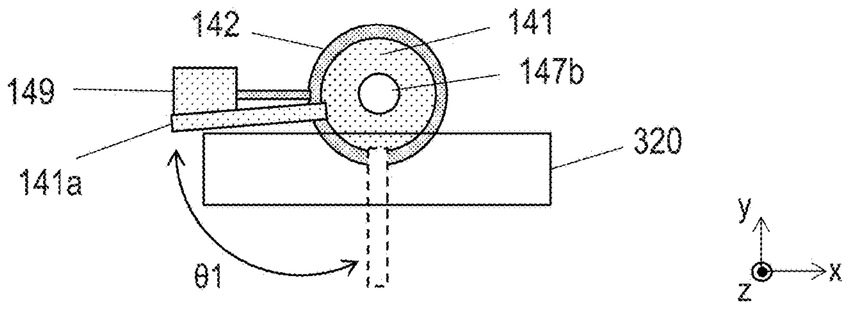
FIGS. 6A and 6B are schematic views showing the biasing mechanism of the liquid storage container in a state shown in FIG. 4.
Figure 6B:
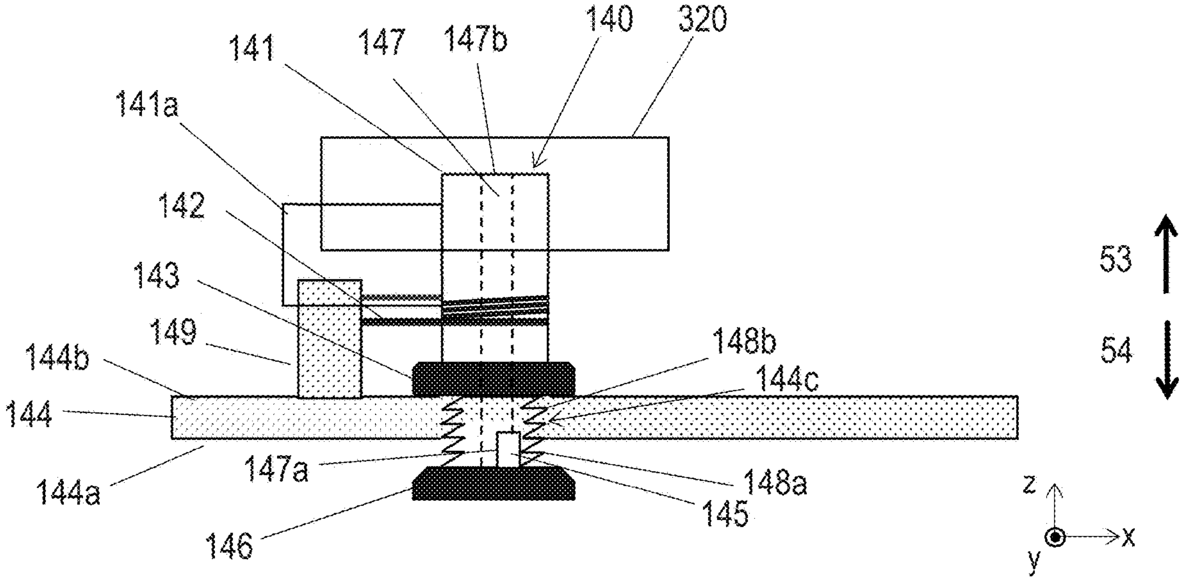

The biasing mechanism will be described in detail with reference to FIGS. 5A to 6B. FIGS. 5A and 5B are views showing a state of the biasing mechanism including the valve unit 140 immediately before the liquid storage container 100 is attached to the holder 3, wherein FIG. 5A is a top view and FIG. 5B is a sectional view. FIGS. 6A and 6B are views showing a state of the biasing mechanism including the valve unit 140 when the liquid storage container 100 is completely attached to the holder 3, wherein FIG. 6A is a top view and FIG. 6B is a sectional view. That is, FIGS. 5A and 5B show a state in which the first seal member 146 is located at the closing position P1, and FIGS. 6A and 6B show a state in which the first seal member 146 is separated from the closing position P1. FIGS. 5B and 6B show cross sections at positions similar to those of FIG. 2. In FIGS. 5A to 6B, only the pressing portion 320 is shown as a constituent member of the holder 3 for convenience. The pressing portion 320 is configured to apply external force to the receiving part of the movable support member 141 to be described later when the liquid storage container 100 is attached to the holder 3.

A male screw 148*a* is provided on an outer peripheral surface of the movable support member 141, and a female screw 148*b* is provided on an inner peripheral surface of the through hole 144*c*. The movable support member 141 is rotatable in a state where the male screw 148*a* and the female screw 148*b* are screwed. When the movable support member 141 is rotated in a first rotational direction (arrow A1), the movable support member 141 moves toward the inside of the liquid reservoir part 110, that is, in the direction of the arrow 54. When the movable support member 141 is rotated in a second rotational direction (arrow A2) opposite to the first rotational direction, the movable support member 141 moves toward the outside of the liquid reservoir part 110, that is, in the direction of the arrow 53.

The movable support member 141 has a receiving part which receives an external force. The external force moves the first seal member 146 from the closing position P1 so that the inside of the liquid reservoir part 110 communicates with the outside of the liquid reservoir part 110 via the air communication passage 147. Here, the pressing force of the pressing portion 320 is used as the external force. The movable support member 141 includes, as an external force receiving part, a pressure receiving part 141*a* disposed outside the liquid reservoir part 110 and extending in a direction intersecting the rotational axis of the movable support member 141. When the liquid storage container 100 is attached to the holder 3, the pressing portion 320 presses the pressure receiving part 141*a*, so that the movable support member 141 rotates in the first rotational direction.

The torsion coil spring 142 is configured to receive a torsion moment (arrow A) about the central axis of the coil. In the torsion coil spring 142, a coil part is attached to the outer peripheral surface of the movable support member 141, an upper end of the coil is fixed to the movable support member 141, and a lower end of the coil is fixed to a spring support part 149. The spring support part 149 is provided on the second surface 144*b* of the partition wall 144. The torsion coil spring 142 biases the movable support member 141 in the second rotational direction (arrow A2) so as to maintain the closed state in which the first seal member 146 is arranged at the closing position P1.

When the liquid storage container 100 is attached to the holder 3, as shown in FIGS. 6A and 6B, the pressing portion 320 presses the pressure receiving part 141*a* of the movable support member 141, and the movable support member 141 rotates in the first rotational direction (arrow A1) by an angle θ1. Rotating in the first rotational direction causes the movable support member 141 to move in the direction of the arrow 54. As a result, the first seal member 146 is separated from the closing position P1, and the second seal member 143 is brought into close contact with the second surface 144*b* of the partition wall 144 to close the gap between the movable support member 141 and the through hole 144*c*. In this way, the liquid storage container 100 is switched to an open state in which the liquid reservoir part 110 communicates with the atmosphere. In the switching to the open state, the torsion coil spring 142 receives a torsion moment corresponding to the rotation amount of the angle θ1. This torsion moment acts to rotate the movable support member 141 in the second rotational direction (arrow A2).

When the liquid storage container 100 is detached from the holder 3, the pressing portion 320 is separated from the pressure receiving part 141*a*, and the pressure of the pressing portion 320 against the pressure receiving part 141*a* is released. When the pressing portion 320 is separated from the pressure receiving part 141*a*, the movable support member 141 is rotated by an angle θ1 in the second rotational direction by the action of the torsional moment. Rotating in the second rotational direction causes the movable support member 141 to move in the direction of the arrow 53. As a result, the second seal member 143 is separated from the second surface 144*b* of the partition wall 144, and the first seal member 146 is moved to the closing position P1 to close the gap between the movable support member 141 and the through hole 144*c*. In this way, the liquid storage container 100 is switched to a closed state in which the liquid reservoir part 110 is sealed.

In the biasing mechanism, the distance D1 between the second seal member 143 and the first surface 144*a* of the partition wall 144 corresponds to the movement amount of the movable support member 141 corresponding to the rotational amount of the angle θ1, and can be defined by a pitch of the screw and the angle θ1. The rotatable angle range (range of angle θ 1) of the movable support member 141 is preferably 30°-150°, for example. Within this angle range, the open state and the closed state can be satisfactorily realized by the action of the torsional moment.

According to the liquid storage container 100 of the present embodiment described above, the first seal member 146 closes the air communication passage 147 in a detached state, so that the liquid reservoir part 110 is kept in a sealed state. Therefore, for example, even when the liquid storage container 100 is transported or the user picks up the liquid storage container 100 and tilts it, the liquid reserved in the liquid reservoir part 110 does not leak out of the liquid storage container 100.

The first seal member 146 is configured so as to close the air communication passage 147 from the inside of the liquid reservoir part 110 by closely contacting with the first surface 144*a* of the partition wall 144. Therefore, even if the internal pressure of the liquid reservoir part 110 increases due to transportation or the like, the first seal member 146 is not separated from the first surface 144*a*, and the closed state can be maintained.

Further, in the open state, since the second seal member 143 closes the gap between the movable support member 141 and the through hole 144*c*, it is possible to suppress leakage of the liquid inside the liquid reservoir part 110 to the outside through the gap between the movable support member 141 and the through hole 144*c*.

Second Embodiment

Figure 7:
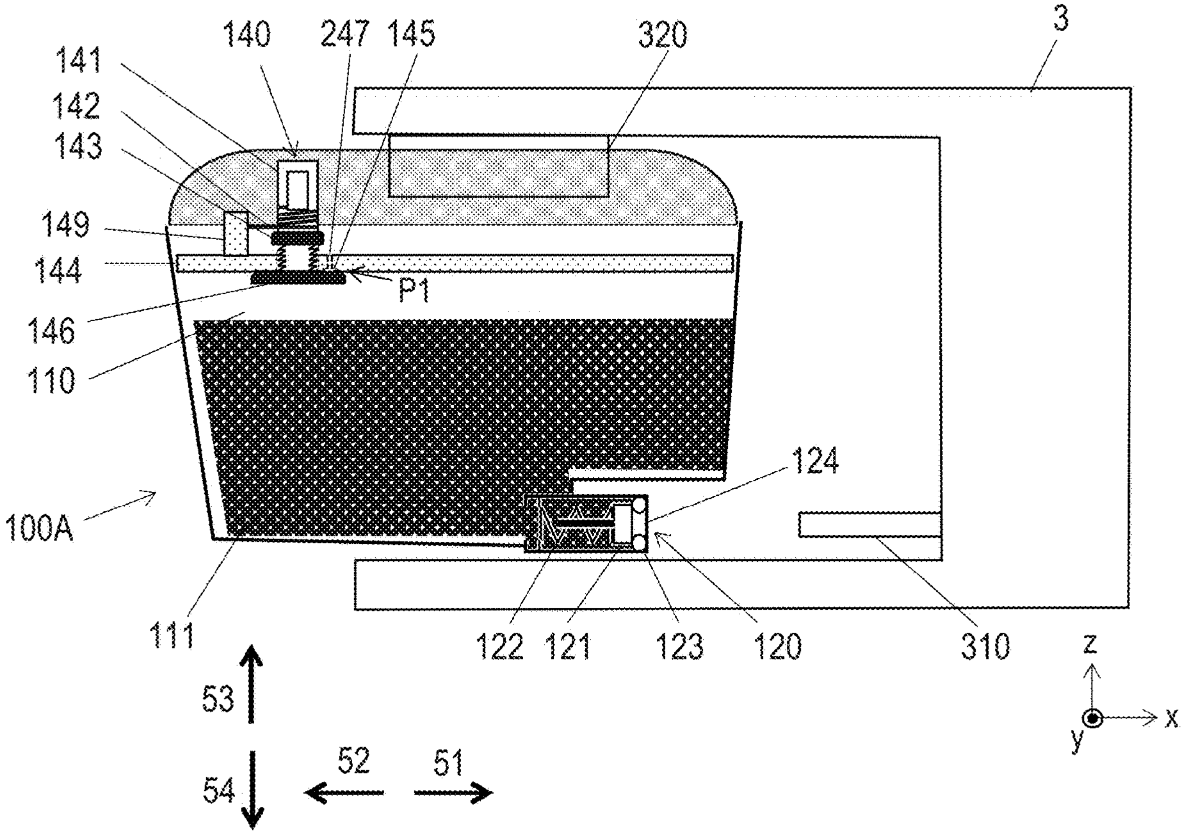
FIG. 7 is a cross sectional view of a liquid storage container according to a second embodiment of the present disclosure when the liquid storage container is not attached to the printing apparatus.
Figure 8:
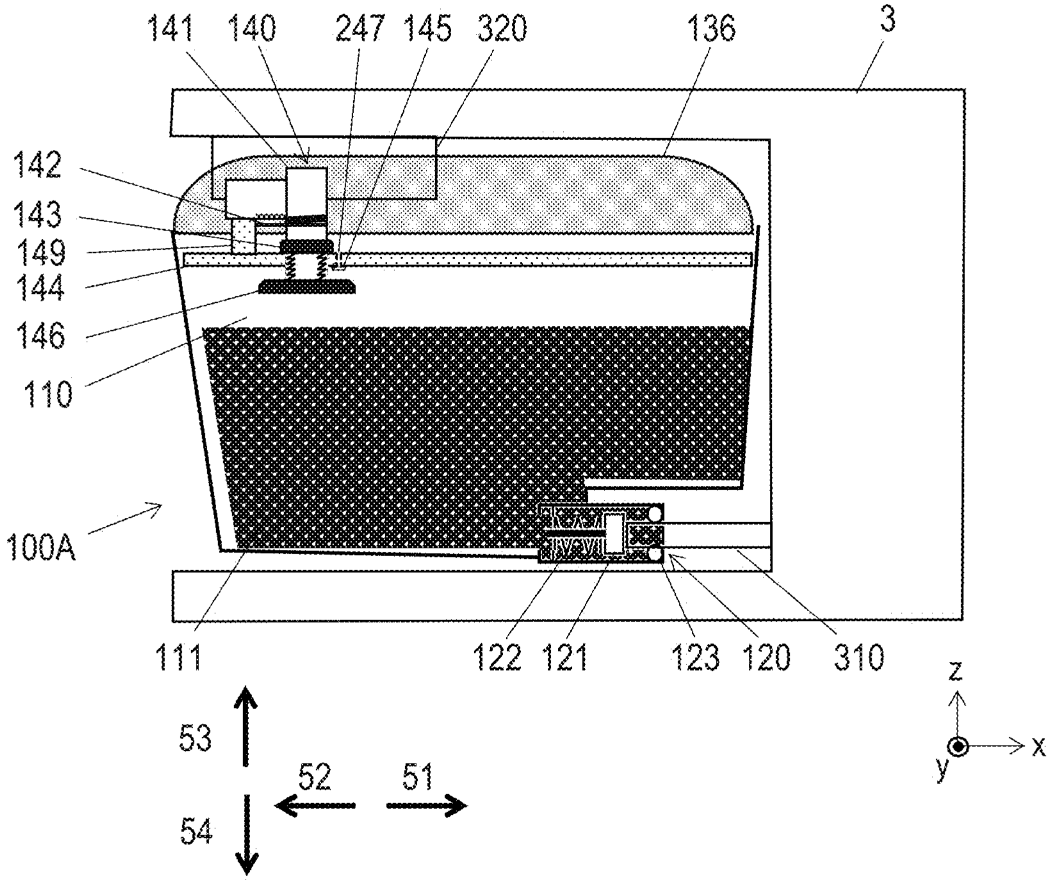
FIG. 8 is a cross sectional view showing the liquid storage container according to the second embodiment of the present disclosure when the liquid storage container is attached to the printing apparatus.

FIGS. 7 and 8 are cross sectional views showing the configuration of a liquid storage container 100A according to a second embodiment of the present disclosure. FIG. 7 shows a state immediately before the liquid storage container 100A is attached to the holder 3.

FIG. 8 shows a state in which the liquid storage container 100A is completely attached to the holder 3. FIGS. 7 and 8 show the configuration of a cross section cut in the vertical direction along the longitudinal direction of the liquid storage container 100A.

Figure 9:
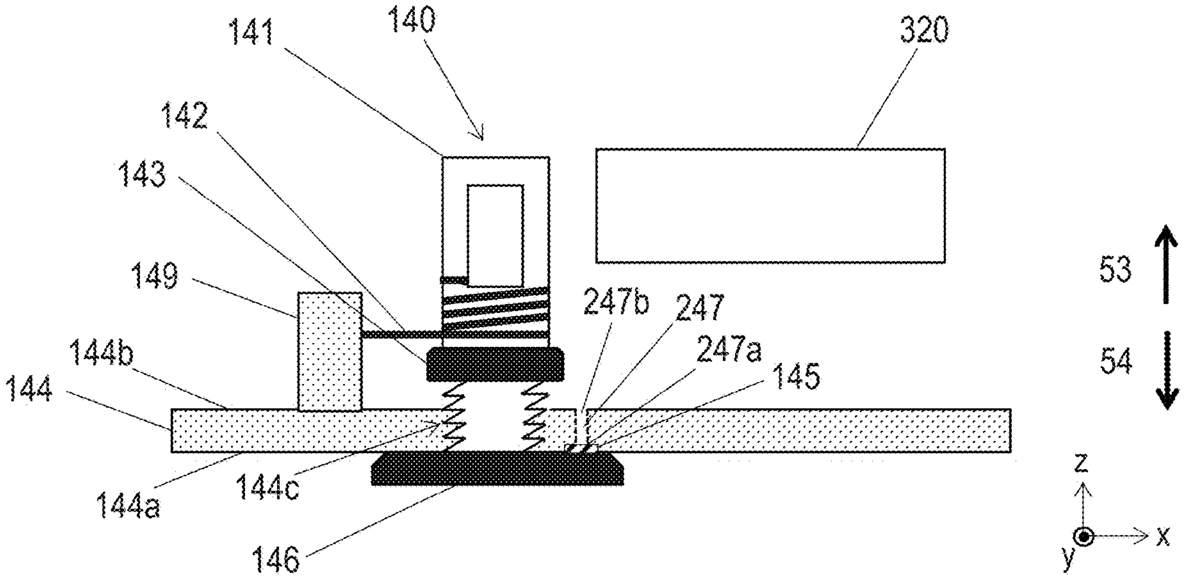
FIG. 9 is a schematic view showing the biasing mechanism of the liquid storage container in a state shown in FIG. 7.
Figure 10:
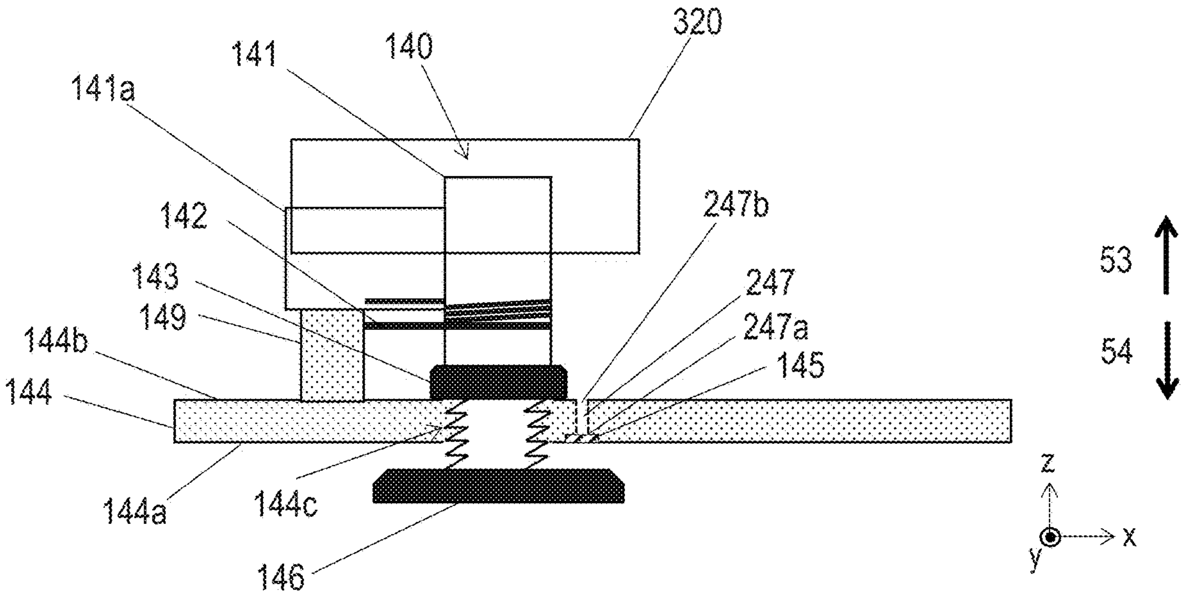
FIG. 10 is a schematic view showing the biasing mechanism of the liquid storage container in a state shown in FIG. 8.

FIG. 9 is a view showing the state of the biasing mechanism including the valve unit 140 immediately before the liquid storage container 100A is attached to the holder 3. FIG. 10 is a view showing the state of the biasing mechanism including the valve unit 140 when the liquid storage container 10 A is completely attached to the holder 3. That is, FIGS. 7 and 9 show a state in which the first seal member 146 is located at the closing position P1, and FIGS. 8 and 10 show a state in which the first seal member 146 is separated from the closing position P1. FIGS. 9 and 10 show cross sections at positions similar to FIGS. 7 and 8. In FIGS. 9 and 10, only the pressing portion 320 is shown as a constituent member of the holder 3 for convenience.

The liquid storage container 100A of the present embodiment is different from the liquid storage container 100 of the first embodiment in that the liquid storage container 100A has an air communication passage 247 instead of the air communication passage 147. The same components as those of the first embodiment are denoted by the same reference numerals, and descriptions of these components are omitted here in order to avoid duplication of descriptions.

The air communication passage 247 is provided in the partition wall 144. The air communication passage 247 has a first opening 247*a* communicating with the inside of the liquid reservoir part 110 and a second opening 247*b* communicating with the outside of the liquid reservoir part 110. Here, the air communication passage 247 is provided so as to penetrate from the first surface 144*a* to the second surface 144*b* of the partition wall 144. The first opening 247*a* is adjacent to the through hole 144*c*. With the movable support member 141 disposed in the closing position P1, the first seal member 146 closes the first opening 247*a*. The gas-liquid separation membrane 145 is provided in the first opening 247*a*.

As shown in FIGS. 7 and 9, in the detached state, the first seal member 146 is in the closing position P1. The first seal member 146 closes the gap between the movable support member 141 and the through hole 144*c*, and closes the first opening 247*a* of the air communication passage 247. In this way, the liquid storage container 100A is in the closed state with the air communication passage 247 closed.

As shown in FIGS. 8 and 10, when the liquid storage container 100A is attached to the holder 3, the pressing portion 320 presses the pressure receiving part 141*a* of the movable support member 141. The movable support member 141 rotates in the first rotational direction and moves in the direction of the arrow 54. As a result, the first seal member 146 is separated from the closing position P1, and the second seal member 143 closes the gap between the movable support member 141 and the through hole 144*c*. In this manner, the liquid reservoir part 110 communicates with the atmosphere through the air communication passage 247, and the liquid storage container 100A is switched to the open state.

Similarly to the case of the first embodiment, the liquid storage container 100A of the present embodiment can also prevent leakage of the liquid when the liquid storage container is removed from the printing apparatus or when the internal pressure of the liquid reservoir part 110 increases.

In the closed state, since the first seal member 146 closes the gap between the movable support member 141 and the through hole 144*c*, it is possible to suppress leakage of the liquid inside the liquid reservoir part 110 to the outside through the gap between the movable support member 141 and the through hole 144*c*.

Further, in the open state, since the second seal member 143 closes the gap between the movable support member 141 and the through hole 144*c*, it is possible to suppress leakage of the liquid inside the liquid reservoir part 110 to the outside through the gap between the movable support member 141 and the through hole 144*c*.

Third Embodiment

Figure 11:
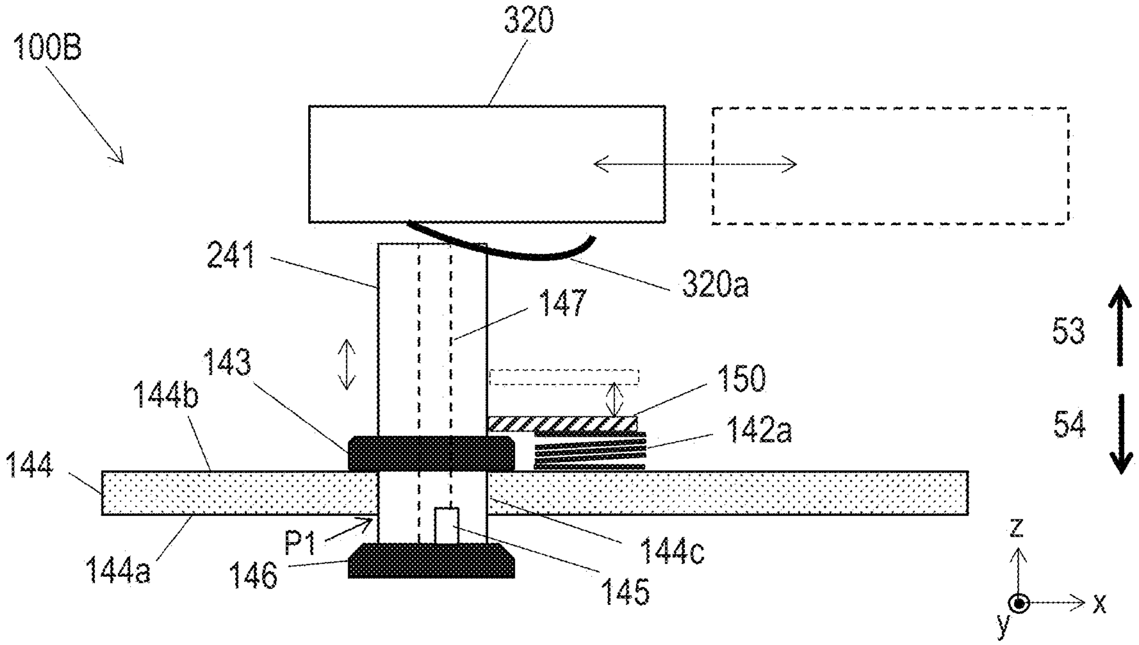
FIG. 11 is a cross sectional view showing a configuration of a liquid storage container according to a third embodiment of the present disclosure.
Figure 12:
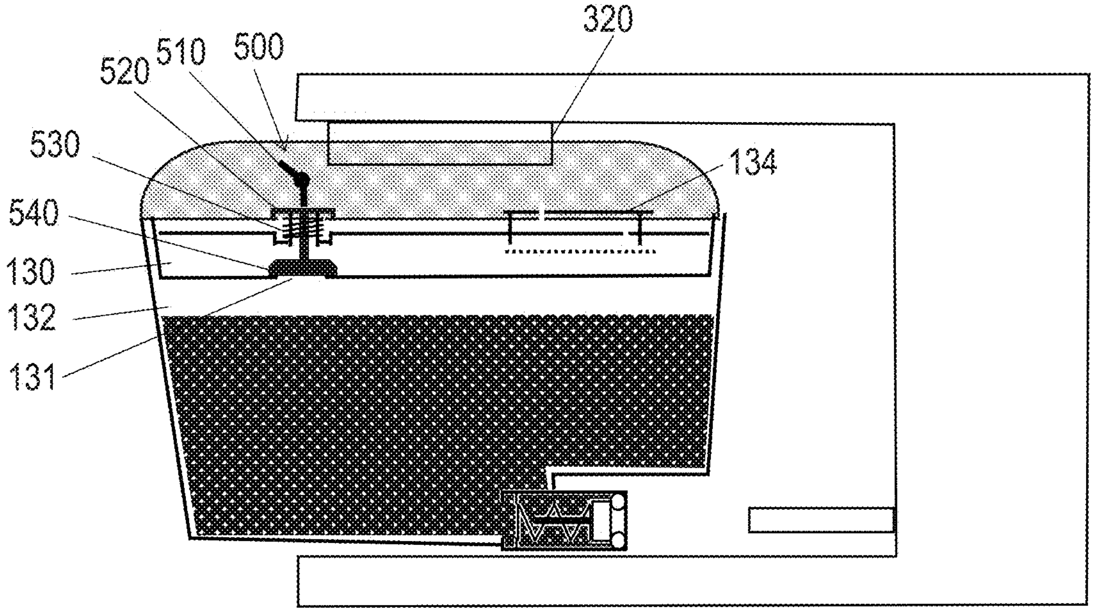
FIG. 12 is a schematic view showing a state immediately before a liquid cartridge is attached to a printer main body.
Figure 13:
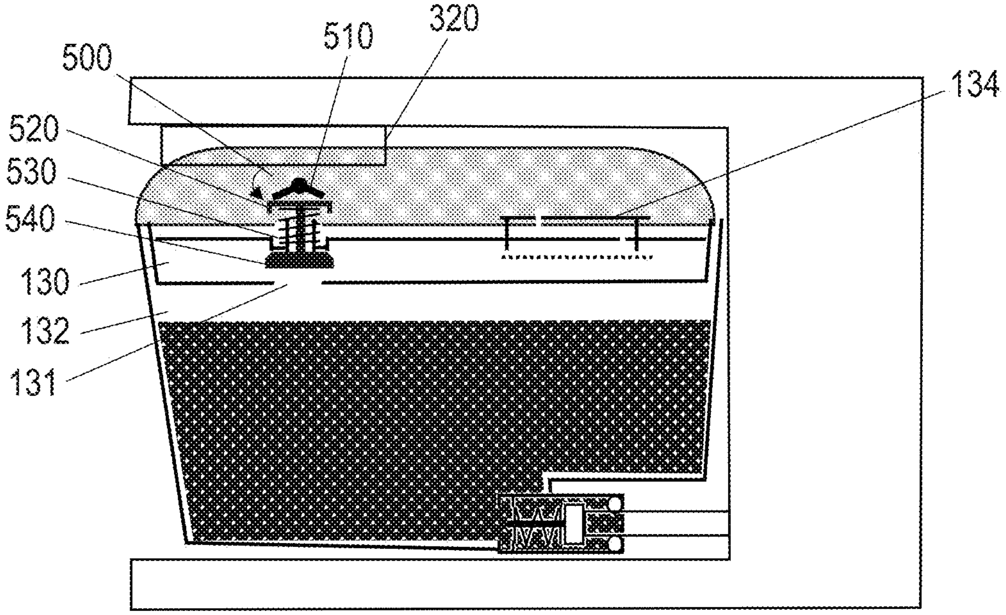
FIG. 13 is a schematic view showing a state after the liquid cartridge after is attached to the printer main body.

FIG. 11 is a cross sectional view showing the configuration of a biasing mechanism of a liquid storage container 100B according to a third embodiment of the present disclosure. FIG. 11 shows the structure of the cross section in a position similar to that of FIGS. 5A and 5B. In FIG. 11, only the pressing portion 320 is shown as a component of the holder 3 for convenience.

The liquid storage container 100B of the present embodiment differs from the liquid storage container 100 of the first embodiment in that it does not have the male screw 148*a* and the female screw 148*b* and uses a coil spring 142A instead of the torsion coil spring 142. A part of a movable support member 241 is inserted into the through hole 144*c* of the partition wall 144. An outer peripheral surface of a movable support member 241 is in contact with an inner peripheral surface of the through hole 144*c*, and the movable support member 241 can slide in the penetration direction (z-axis direction). The outer peripheral surface of the movable support member 241 and the inner peripheral surface of the through hole 144*c* have concentric circular shapes in the x-y plane. A spring support part 150 for supporting an upper end of a coil spring 142A is provided at an outer part of the movable support member 241. The spring support part 150 extends in a direction perpendicular to the longitudinal direction of the movable support member 241. The spring support part 150 is parallel to the second surface 144*b* of the partition wall 144 and is located on an outer side (opposite to the partition wall 144) of the second seal member 143. In other words, the second seal member 143 is located between the spring support part 150 and the second surface 144*b* of the partition wall 144.

A lower end of the coil spring 142A is in contact with the second surface 144*b* of the partition wall 144. The Coil spring 142A biases the movable support member 241 such that the first seal member 146 maintains the closed state in which the first seal member 146 closes the air communication passage 147 at the closing position P1. Specifically, the coil spring 142A biases the movable support member 241 in a direction toward the outside (arrow 53). The movable support member 241 is provided with an air communication passage 147 described in the first embodiment.

The pressing portion 320 has a leaf spring 320*a* that biases the movable support member 241 in a direction (arrow 54) opposite to the biasing direction of the coil spring 142A. In the present embodiment, an end of the movable support member 241 in contact with the leaf spring 320*a* serves as the receiving part of the external force. Instead of the leaf spring 320*a*, a slope acting to move the movable support member 241 in the direction of the arrow 54 may be provided in the pressing portion 320.

In the liquid storage container 100B of the present embodiment, the first seal member 146 is located in the closing position P1 and the first opening 147*a* of the air communication passage 147 is housed in the through hole 144*c* in the detached state. The first seal member 146 closes the gap between the movable support member 241 and the through hole 144*c* at the closing position P1. In this way, the liquid storage container 100B becomes the closed state with the air communication passage 147 closed.

When the liquid storage container 100B is attached to the holder 3, the leaf spring 320*a* of the pressing portion 320 biases the movable support member 241 in the direction of the arrow 54. When the movable support member 241 moves in the direction of the arrow 54, the first seal member 146 moves away from the closing position P1, and the second seal member 143 closes the gap between the movable support member 241 and the through hole 144*c*. In this way, the liquid storage container 100B is switched to an open state in which the liquid reservoir part 110 communicates with the atmosphere through the air communication passage 147.

In the liquid storage container 100B of the present embodiment, as in the first embodiment, leakage of the liquid can be prevented when it is detached from the printing device or when the internal pressure of the liquid reservoir part 110 increases.

In addition, according to the liquid storage container 100B of the present embodiment, the structure of the container can be made simple because it does not have a screw structure compared with the first embodiment.

The biasing mechanism of the liquid storage container 100B of the present embodiment can also be applied to the liquid storage container 100A of the second embodiment. In such case, in the detached state, the first seal member 146 closes the gap between the movable support member 241 and the through hole 144*c* at the closing position P1, and closes the opening 247*a* of the air communication passage 247. As a result, the liquid storage container 100A becomes a closing state with the air communication passage 247 closed.

On the other hand, when the liquid storage container 100B is attached to the holder 3, the leaf spring 320*a* of the pressing portion 320 biases the movable support member 241 in the direction of the arrow 54. When the movable support member 241 moves in the direction of the arrow 54, the first seal member 146 moves away from the closing position P1, and the second seal member 143 closes the gap between the movable support member 241 and the through hole 144*c*. With this, the liquid storage container 100B is switched to the open state in which the liquid reservoir part 110 communicates with the atmosphere through the air communication passage 247.

The above application example also exhibits the same working effect as that of the second embodiment.

According to the present disclosure, even when the liquid storage container is removed from the printing apparatus or when the internal pressure of the liquid reservoir part increases, leakage of the liquid from the liquid storage container can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-169410, filed Oct. 15, 2021, which is hereby incorporated by reference herein in its entirety.

What is claimed is:

1. A liquid storage container comprising:

a liquid reservoir part configured to reserve a liquid;

an air communication passage for communicating the liquid reservoir part with an atmosphere;

a partition wall configured to separate an inside of the liquid reservoir part and an outside of the liquid reservoir part;

a through hole configured to penetrate the partition wall in a first direction;

a movable support member capable of moving in the through hole in the first direction;

a first seal member disposed in the liquid reservoir part and fixed to the movable support member; and a biasing member configured to bias the movable support member so that the first seal member is positioned at a closing position where the first seal member closes the air communication passage, wherein the movable support member includes a receiving part configured to receive an external force, and wherein the external force moves the first seal member from the closing position so that the inside of the liquid reservoir part communicates with the outside of the liquid reservoir part via the air communication passage.

2. The liquid storage container according to claim 1, wherein the movable support member is inserted into the through hole, and wherein the first seal member closes a gap between the movable support member and the through hole at the closing position.

3. The liquid storage container according to claim 2, wherein the air communication passage is provided on the movable support member.

4. The liquid storage container according to claim 3, wherein the air communication passage includes (1) a first opening communicating with the inside of the liquid reservoir part and (2) a second opening communicating with the outside of the liquid reservoir part, and wherein the first opening is accommodated in the through hole with the first seal member positioned in the closing position.

5. The liquid storage container according to claim 1, wherein the air communication passage is provided on the partition wall.

6. The liquid storage container according to claim 5, wherein the air communication passage includes (1) a first opening communicating with the inside of the liquid reservoir part and (2) a second opening communicating with the outside of the liquid reservoir part, and wherein the first seal member closes the first opening with the first seal member positioned in the closing position.

7. The liquid storage container according to claim 4, wherein a gas-liquid separation membrane for separating gas and liquid is provided at the first opening.

8. The liquid storage container according to claim 1, further comprising a second seal member disposed outside the liquid reservoir part and fixed to the movable support member, wherein when the movable support member is moved in a direction opposite to a biasing direction along which the biasing member biases the movable support member, the second seal member closes a gap between the movable support member and the through hole.

9. The liquid storage container according to claim 1, further comprising:

a male screw part provided on an outer peripheral surface of the movable support member; and a female screw part provided on an inner peripheral surface of the through hole, wherein the movable support member is rotatable in a state in which the male screw part and the female screw part are screwed, and is configured to move toward the inside of the liquid reservoir part when rotating in a first rotational direction, and to move toward the outside of the liquid reservoir part when rotating in a second rotational direction opposite to the first rotational direction, and wherein the biasing member biases the movable support member in the second rotational direction.

10. The liquid storage container according to claim 9, wherein the receiving part is a pressing force receiving part disposed outside the liquid reservoir part and extending in a direction intersecting a rotation axis of the movable support member, and wherein the movable support member is rotated by pressing the pressing force receiving part.

11. The liquid storage container according to claim 9, wherein a rotatable angle range of the movable support member is between 30° and 150°.

12. The liquid storage container according to claim 9, wherein the biasing member is a torsion coil spring.

13. The liquid storage container according to claim 1, wherein the biasing member biases the movable support member in the first direction from the inside of the liquid reservoir part to the outside of the liquid reservoir part.

14. The liquid storage container according to claim 13, wherein the biasing member is a coil spring.

15. The liquid storage container according to claim 1, further comprising a liquid supply port configured to supply the liquid reserved in the liquid reservoir part to an outside.

16. The liquid storage container according to claim 1, wherein the liquid storage container is detachably attached to a printing apparatus for discharging the liquid, and wherein when the liquid storage container is attached to the printing apparatus, (1) the printing apparatus exerts the external force on the receiving part, and (2) the movable support member moves in a direction opposite to a biasing direction along which the biasing member biases the movable support member.

17. The liquid storage container according to claim 9, wherein the liquid storage container is detachably attachable to a printing apparatus for discharging the liquid, and wherein when the liquid storage container is attached to the printing apparatus, (1) the printing apparatus exerts the external force on the receiving part, and (2) the movable support member rotates in the first rotational direction.

18. The liquid storage container according to claim 13, wherein the liquid storage container is detachably attachable to a printing apparatus for discharging the liquid, and wherein when the liquid storage container is attached to the printing apparatus, (1) the printing apparatus exerts the external force on the receiving part, and (2) the movable support member moves in the first direction from the outside of the liquid reservoir part toward the inside of the liquid reservoir part.

19. A liquid storage container comprising:

a liquid reservoir part configured to reserve a liquid;

a partition wall configured to separate an inside of the liquid reservoir part and an outside of the liquid reservoir part;

a through hole configured to penetrate the partition wall in a first direction;

a movable support member inserted into the through hole, the movable support member being capable of moving in the through hole in the first direction, and including (1) a first opening communicating with the outside of the liquid reservoir part, and (2) a second opening communicating with the first opening;

a first seal member disposed on the movable support member; and a biasing member configured to bias the first seal member so that the first seal member is positioned at a first position where the first seal member is in contact with the partition wall, wherein an opening area of the second opening is covered by the partition wall when the first seal member is at the first position, wherein the movable support member includes a receiving part configured to receive an external force, and wherein by moving the movable support member by receiving the external force, the first seal member moves from the first position to a second position where at least a part of the second opening is exposed from the partition wall, and the inside of the liquid reservoir part is communicated with the outside of the liquid reservoir part through the first opening and the second opening.

20. The liquid storage container according to claim 19, wherein the first seal member is disposed at the inside of the liquid reservoir part.

* * * * *